E. BECKERMANN.
WHEEL.
APPLICATION FILED DEC. 11, 1911.

1,044,005.

Patented Nov. 12, 1912.

Witnesses:
Peter Meffert.
Carl Maurer.

Inventor:

UNITED STATES PATENT OFFICE.

EMMERICH BECKERMANN, OF KOBLENZ, GERMANY.

WHEEL.

1,044,005.  Specification of Letters Patent.  Patented Nov. 12, 1912.

Application filed December 11, 1911. Serial No. 665,067.

*To all whom it may concern:*

Be it known that I, EMMERICH BECKERMANN, engineer, a subject of the King of Prussia and German Emperor, residing at Koblenz-on-the-Rhine, in the Kingdom of Prussia and German Empire, have invented certain new and useful Improvements in Wheels, of which the following is a specification.

My invention relates to improvements in wheels.

According to my invention the arrangement of the wheel is such that the hub, spokes and rim are composed of parts which after having been assembled together are filled or cast out with an artificial-wood mass, so as to form one single body.

My invention relates also to a metallic hub comprising several pieces, said metallic hub receiving the inner ends of the spokes and holding the same by means of said artificial wood-mass.

Furthermore, my invention relates to a rim formed of a metallic ring adapted to take up the outer ends of the spokes and to receive the artificial-wood mass intended for holding the parts together, the arrangement being preferably such that an elastic layer or lining is situated between the outer surface of the artificial-wood mass and the iron-tire of the wheel.

By using the metallic hub and spoke-ring which according to my invention have only to be filled out with artificial-wood mass great advantages are obtained consisting for example in great simplicity of construction and great facility in fitting up or erecting the wheel. Furthermore, no special forms are necessary for filling or casting out the hub and the spoke-ring made according to my invention.

I am aware that wheels formed of artificial-wood mass and metallic armatures are already known, but not with the special arrangement and combination of parts forming the object of my invention.

Figure 1:
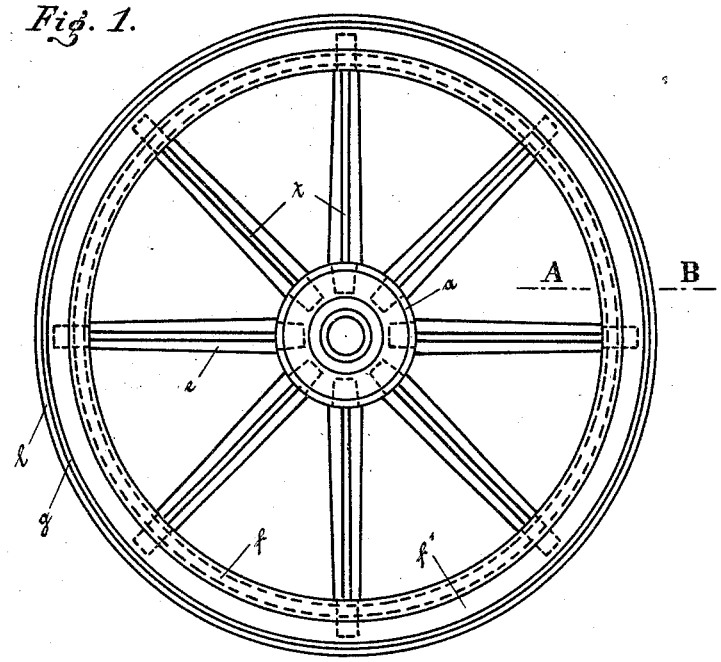
Figure 2:
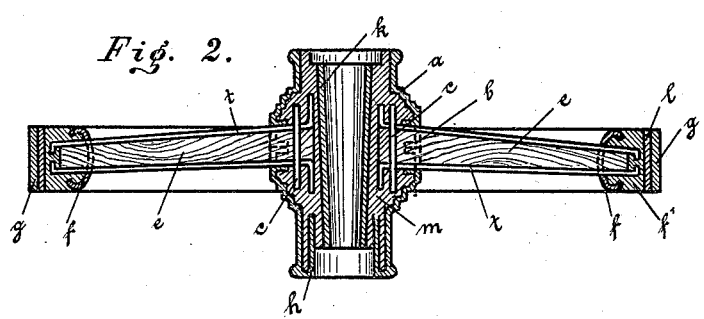
Figure 3:
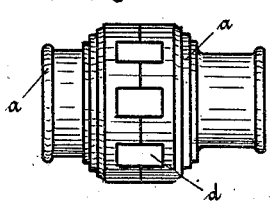
Figure 4:
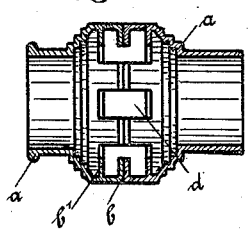
Figure 5:
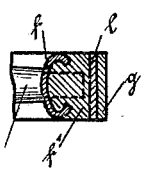

In the accompanying drawing forming a part of this specification, and in which similar letters of reference relate to corresponding parts throughout the several views, Figure 1 is a front-view of a wheel constructed according to my invention, Fig. 2 is a vertical section of same, Fig. 3 a side-view of the hub, Fig. 4 a longitudinal section of same, Fig. 5 a section of the rim on the line A—B of Fig. 1.

Referring now to the drawings the hub of the wheel is composed of a hollow body $a$ which is formed of two parts provided with median flanges $b$ bent inwardly at a right angle and abutting together so as to keep both hub-pieces in place. Further the hub $a$ possesses openings $d$ formed in both of said hub-parts, said openings $d$ being intended to receive the corresponding inner ends of the spokes of the wheel. Moreover, the outer edges of the openings $d$ carry flaps $b^1$ being bent inwardly to a right angle. Said flaps $b^1$ form an abutment against which rest the corresponding parts of the spokes and at the same time serve to afford a firm connection between the hub $a$ and the artificial-wood mass $m$. Into the hub $a$ is inserted the wheel-bush $k$. The spokes $e$ fastened at their inner ends in said openings $d$ are made of wood or, if desired, of metallic tubes and pass at their outer ends through a spoke-ring $f$ surrounded by an artificial-wood mass $f^1$ said spoke-ring $f$ being provided with bends engaging into said artificial-wood mass $f^1$. In wheels of strong construction or heavy character the wooden spokes are provided on both sides with a reinforcement formed of a metallic strip or rod $t$ resting against the corresponding side of the spoke, said strips or rods engaging with their suitably bent ends into the artificial-wood masses $m$ and $f^1$, whereby a connection of great strength and resistance between the spokes $e$ and said artificial-wood masses contained in the hub and the wheel-rim is obtained.

In wheels of light character rods $c$ passing through corresponding openings of the spokes are sufficient for forming the joint. As already mentioned, the hub $a$, the spokes $e$ and the spoke-ring $f$ are readily connected and easily filled with artificial-wood mass $m$ and $f^1$, so that a very efficient connection is obtained in this way. The outer surface of the artificial-wood mass $f^1$ of the rim is preferably provided with an elastic layer or lining $l$ intended to take up or annihilate the vibrations or jerks of the wheel and to protect the iron-tire $g$ of the wheel against the corrosive action of the artificial-wood mass which contains magnesium chlorid. Preferably the hub $a$ is also formed with an inner reinforcing ring $h$ the one extremity of said ring $h$ being embedded in the artificial-wood mass $m$. Of course, the parts $b$ of the hub $a$ may also engage into each other instead of abutting together.

Having thus described my invention, what I claim and desire to secure by Letters Patent of the United States is:—

1. In a wheel for cars and other vehicles, the combination with spokes and a hub to which the inner ends of said spokes are secured, of a spoke-ring $f$ receiving the outer ends of said spokes, an artificial-wood mass $f^1$ cast around said outer ends of the spokes and said spoke-ring $f$, the latter having inwardly directed bends engaging in said artificial-wood mass, and a tire encircling said artificial-wood mass.

2. In a wheel for cars and other vehicles, the combination with spokes and a rim, of a hub $a$ comprising two parts, said hub $a$ being provided with openings $d$ formed in both of said hub-parts, said openings receiving the inner ends of the spokes, flanges $b$ bent inwardly between said openings, said flanges abutting together so as to keep both hub-pieces to a predetermined distance from one another, flaps $b^1$ carried by the outer edges of said openings $d$, said flaps $b^1$ forming abutments between which are clamped the inner ends of the spokes, and an artificial-wood mass $m$ filling out said two hub-parts, said artificial-wood mass surrounding said flaps $b^1$ so as to augment the strength of the connection, substantially as described.

3. In a wheel for cars and other vehicles, the combination with spokes, of a hub $a$ consisting of two hollow pieces abutting together and provided with openings $d$ receiving the inner ends of said spokes, an artificial-wood mass $m$ filling out said two hollow hub-pieces, a spoke-ring $f$ receiving the outer ends of the spokes, a tire $g$ encircling said spoke ring and an artificial-wood mass $f^1$ filling the interval between said spoke-ring $f$ and said tire $g$, substantially as described.

4. In a wheel for cars and other vehicles, the combination with spokes, of a hub $a$ consisting of two hollow-pieces abutting together and provided with openings $d$ receiving the inner ends of said spokes, an artificial-wood mass $m$ filling out said two hollow hub-pieces, a spoke-ring $f$ receiving the outer ends of the spokes, an artificial-wood mass $f^1$ cast around said spoke-ring $f$, the latter having bends engaging into said artificial-wood mass $f^1$, an elastic lining $l$ surrounding said artificial-wood mass $f^1$, and a tire $g$ encircling said artificial-wood mass $f$, substantially as described.

5. In a wheel for cars and other vehicles, the combination of a hub $a$ consisting of two hollow pieces abutting together and provided with openings $d$ receiving the inner ends of the wheel spokes, an artificial-wood mass $m$ filling out said two hollow hub-pieces, wooden spokes $e$ engaging with their inner ends into said openings $d$ of the hub $a$, a spoke-ring $f$ receiving the outer ends of said spokes $e$, an artificial-wood mass $f^1$ cast around said spoke-ring $f$, an elastic lining $l$ surrounding said artificial-wood mass $f^1$, a tire $g$ encircling said artificial-wood mass $f^1$, and two strengthening metallic strips $t$ arranged upon the two outer surfaces of the wooden spokes $e$, said strips $t$ being provided with bends engaging into the artificial-wood mass $m$ and $f^1$ so as to produce a stronger and more efficient connection, substantially as described.

6. In a wheel for cars and other vehicles, the combination of a hub $a$ consisting of two hollow pieces abutting together and provided with openings $d$ receiving the inner ends of the wheel-spokes, an artificial-wood mass $m$ filling out said two hollow hub-pieces, wooden spokes $e$ engaging with their inner ends into said openings $d$ of the hub $a$, a spoke-ring $f$ receiving the outer ends of said spokes $e$, an artificial-wood mass $f^1$ cast around said spoke-ring $f$, an elastic lining $l$ surrounding said artificial-wood mass $f^1$, two strengthening metallic strips $t$ arranged upon the two outer surfaces of the wooden spokes $e$, and a metallic armature $c$ passing through the inner ends of the spokes $e$ for keeping the same better in place in said artificial-wood mass $m$, substantially as described.

In testimony whereof I affix my signature in presence of two witnesses.

EMMERICH BECKERMANN.

Witnesses:
CHRIS. VANDORY,
HANS DUMONT.

Copies of this patent may be obtained for five cents each, by addressing the "Commissioner of Patents, Washington, D. C."